United States Patent [19]

Cocksedge et al.

[11] Patent Number: 4,721,895
[45] Date of Patent: Jan. 26, 1988

[54] MULTI-SPEED ANALOG SERVO

[75] Inventors: Kenneth W. Cocksedge, Livermore; William N. Thanos, San Jose, both of Calif.

[73] Assignee: Qume Corporation, San Jose, Calif.

[21] Appl. No.: 554,421

[22] Filed: Nov. 22, 1983

[51] Int. Cl.$^4$ .............................................. G05B 5/01
[52] U.S. Cl. ...................................... 318/618; 318/561
[58] Field of Search ............... 318/615, 616, 617, 618, 318/561

[56] References Cited

U.S. PATENT DOCUMENTS

| | | | |
|---|---|---|---|
| 3,927,360 | 12/1975 | MacMullen | 318/619 |
| 3,986,091 | 10/1976 | Quiogue et al. | 318/594 |
| 4,016,469 | 4/1977 | Lanni et al. | 318/590 |
| 4,241,300 | 12/1980 | Hayes et al. | 318/590 |
| 4,282,469 | 4/1981 | Moriyama | 318/619 |
| 4,523,137 | 6/1985 | Wong | 318/618 X |
| 4,529,325 | 7/1985 | Moon | 318/594 X |
| 4,551,664 | 11/1985 | Wong et al. | 318/594 X |

OTHER PUBLICATIONS

"The Solution to Extremely Slow Motion Control", by Lamar Cowger, Drives & Controls International, Jan. 1982, pp. 7, 86–87.

Primary Examiner—Benjamin Dobeck
Attorney, Agent, or Firm—Christie, Parker & Hale

[57] ABSTRACT

An analog servo system suitable for accurately controlling the carriage speed of a high speed printer over a relatively wide range. The system includes an analog tachometer with circuit means which enables the tachometer to operate in either a high gain mode (used at normal or lower carriage speeds) or a low gain mode (used at higher carriage speeds). The tachometer gain mode (or "electronic gear") is controlled by an external command signal such as a single bit supplied by the control microprocessor of the printer. The state of the command signal controls a time constant in the tachometer circuit means which determines the gain mode.

2 Claims, 4 Drawing Figures

MULTI-SPEED ANALOG SERVO

FIELD OF THE INVENTION

The present invention relates generally to servo systems for controlling the speed of a moving mechanism, e.g., a printer carriage, and more particularly to such systems utilizing an analog tachometer for generating a signal whose voltage is representative of the velocity of the mechanism.

BACKGROUND ART

Conventional velocity servo systems for controlling a printer carriage utilize an analog tachometer as a feedback device to provide a signal representing the actual carriage speed. This tachometer signal is generally summed with a command signal to produce an error signal used to control the motor driving the carriage. The tachometer is normally designed for a particular relatively narrow speed range and compromises in accuracy and response time must be tolerated when it is desired to broaden the speed range.

A digital servo system for a printer carriage has been proposed intended to avoid the aforementioned performance compromises and is disclosed in a copending commonly assigned application Ser. No. 382,107 filed May 26, 1982 for S. D. Moon.

Printer analog servo systems are also known which attempt to avoid the aforementioned compromises by using specially designed circuits employing carefully matched components. However, such solutions have generally proved to be expensive because of the number of parts and the number of precision adjustments required in the manufacturing of such a printer. Moreover, these specially designed circuits generally occupy more circuit board space than is desirable and their overall complexity represents a reliability concern.

Inexpensive integrated circuit packages, (e.g. the SGS-ATES L290 and L291) are commercially available and useful for carriage speed control in relatively slow speed printers. More specifically, the aforementioned integrated circuit packages, when used in their intended manner, are adequate in a servo system for printers operating at about 15 characters per second. However, when used as intended, these devices do not afford the range and accuracy required for higher speed (e.g., in excess of 30 characters per second) letter quality printers.

SUMMARY OF THE INVENTION

Accordingly, it is a primary object of the present invention to provide an analog tachometer servo system that is suitable for high speed printer applications but still relatively inexpensive, requiring a minimum of space and parts, and which may be quickly and easily installed.

This and other objectives may be achieved by providing an analog tachometer circuit capable of selectively operating in either a high gain mode or a low gain mode as determined by an external command signal.

In accordance with a preferred embodiment, the control microprocessor of the printer provides a six bit speed command. Bits 1-5 are applied in a conventional manner to a digital to analog (D/A) converter to produce an analog signal which is summed with the tachometer output signal to produce the aforementioned error signal for driving the carriage motor. Bit 6 is used in accordance with the invention to control the tachometer gain mode by modifying the time constant of a differentiator circuit associated with the tachometer circuit. This variable selection of the tachometer gain mode has the effect of increasing the range of speed control otherwise obtainable using inexpensive commercially available circuits originally designed for less demanding applications.

The aforementioned mode change feature is designed specifically to obtain the best performance from a serial printer by using a high tachometer gain at normal print speeds. For higher print speeds such as would be used for normal tabbing and carriage return, a lower gain is used to achieve performance comparable to the servo systems used in prior printers.

In a sense, this aforedescribed electronic mode change feature is similar to a mechanical gear change, but at a fraction of the price and without any back-lash to spoil registration. This electronic gear change may provide a three times (3×) advantage at all carriage movements of less than 0.3 inches, where most printing takes place. This results in a printer than can hold print speed 3 times better than prior units regardless of temperature, mechanical variations or interchangeability.

BRIEF DESCRIPTION OF THE DRAWINGS

FIG. 3, comprising

DETAILED DESCRIPTION OF A PRESENTLY PREFERRED EMBODIMENT

Figure 1:
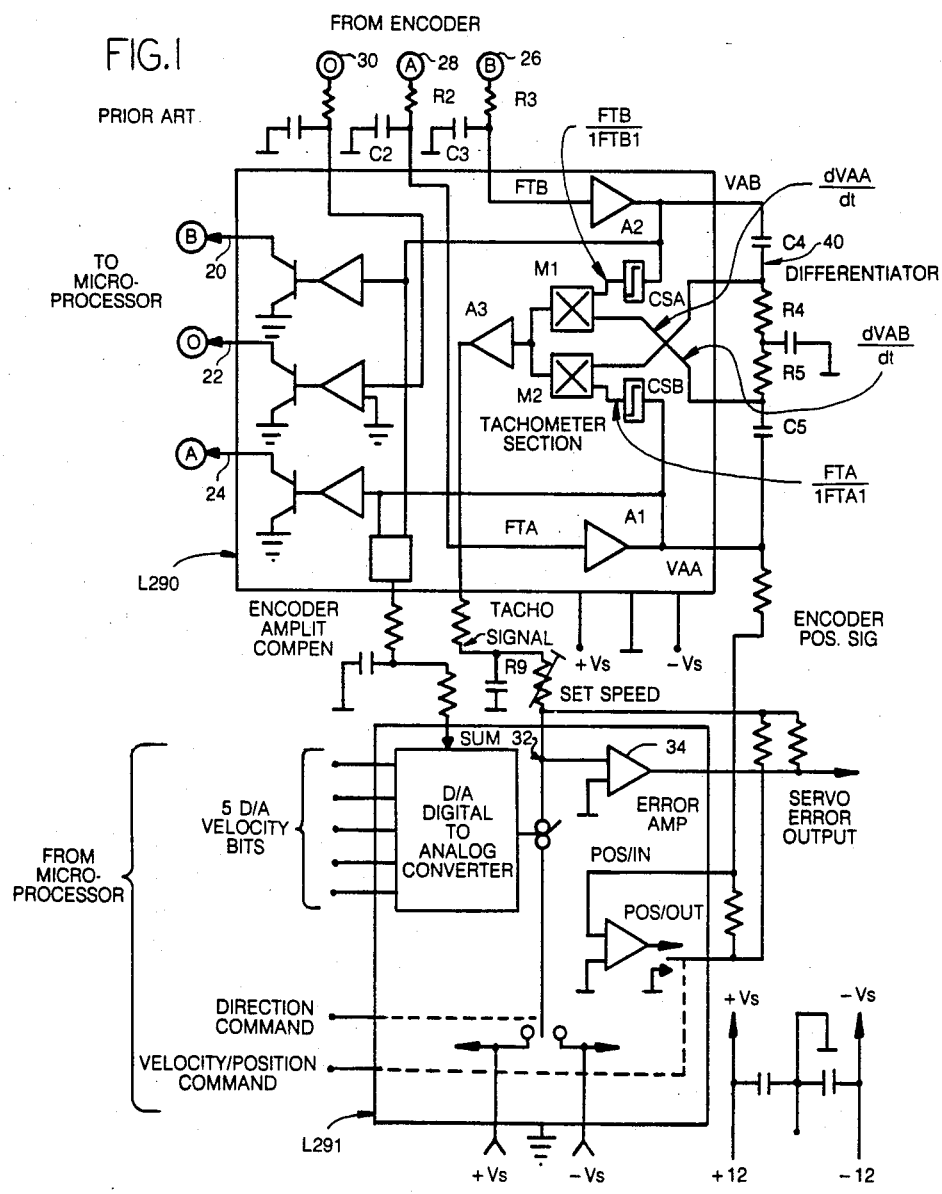
FIG. 1 is a block diagram of a typical prior art servo circuit fabricated from available LSI components.

Attention is initially directed to FIG. 1 which illustrates a prior art arrangement of commercially available linear integrated circuits for a DC motor positioning application such as for carriage or daily wheel position control in typewriters. By understanding the operation and limitations of the prior art system of FIG. 1, the significance of Applicant's invention depicted in FIGS. 2-6 will be more readily understood.

Commercially available linear integrated circuits L290, L291, and L292 are described in the SGS-ATES databook issued February 1981. As explained therein, the L290, L291, and L292 circuits are intended for use together to form a complete three clip DC motor positioning system. Briefly, the L290 chip integrates the following functions: (1) Tachometer voltage generator (2) Reference voltage generator and (3) Position pulse generator. The L291 chip integrates the following functions: (1) Five bit D-A conversion (2) Error amplifier (3) Position amplifier. The L292 chip comprises a motor driver.

Although the L290, L291, and L292 chips are intended to be used together as a three chip microprocessor control positioning system, it is indeed recognized that these circuits may be used separately and it is not uncommon for the L290 and L291 to be used together, as depicted in FIG. 1, without the specific L292 motor driver.

As described in the aforementioned SGS-ATES databook, the positioning system of FIG. 1, utilizing circuits L290 and L291, selectively operates in a velocity mode or a positioning mode to achieve high speed, high accuracy positioning. Speed commands for the system originate in the printer control microprocessor which is continuously updated on the motor position by means of pulses output from the L290 tachometer chip terminals 20, 22, 24. The L290 tachometer chip in turn gets its information input on terminals 26, 28, 30 from an encoder (not shown) coupled to the controlled motor (not shown). From this basic encoder input, the microprocessor computes a five bit velocity command word which defines a desired motor speed and is dependent on the distance the controlled element, e.g. carriaged, still has to travel. This five bit word is applied to the D/A converter of the L291 chip to produce an analog motor command signal which is applied to the summing point 32 connected to the input of error amplifier 34.

When the motor is stopped and the microprocessor orders it to a new position, the positioning system of FIG. 1 operates initially in an open loop configuration as there will be no meaningful tachometer feedback signal supplied by amplifier A3 of the L290 tachometer chip. Therefore, maximum current will be fed to the motor by error amplifier 34. As maximum speed is reached, the L290 tachometer signal from amplifier A3 increases and thus reduces the net signal applied to the error amplifier 34 from the summing point, thus reducing the motor accelerating torque. The motor then continues to run at top speed but under closed loop control.

As the motor approaches its target position, the microprocessor lowers the value of the five bit speed command word applied to the D/A converter. This reduces the voltage supplied by the D/A converter to summing point 32, thereby braking the motor. The braking is applied progressively until the motor is running at minimum speed. At that time, the microprocessor provides a position command to switch to the position mode to hold the motor in a detented position.

Figure 2:
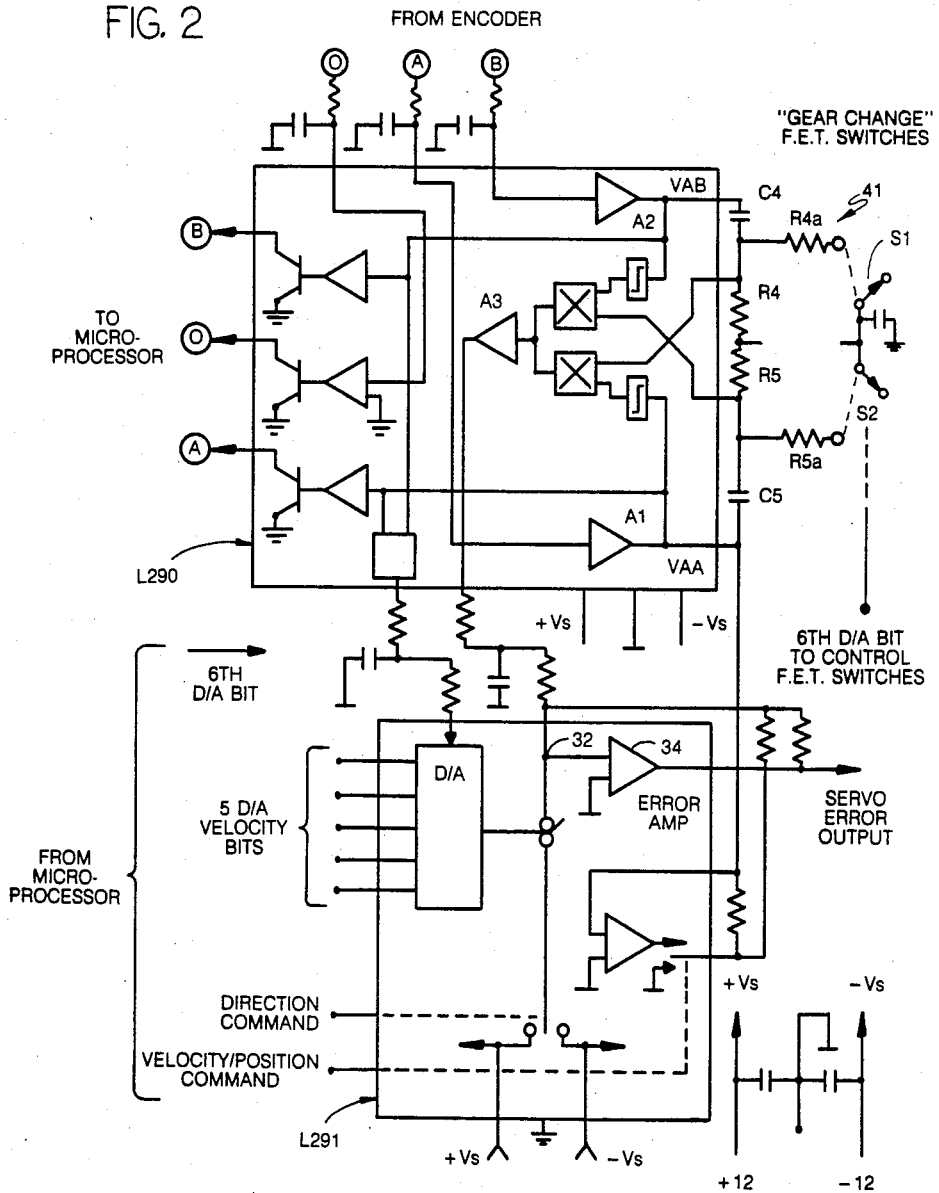
FIG. 2 shows the servo of FIG. 1 modified in accordance with the present invention.

The foregoing description of FIG. 1 should suffice to provide a general understanding of the operation of the positioning system. However, in order to appreciate the improvement introduced by the present invention, as depicted in FIG. 2, it is necessary to more specifically understand the utilization of the external differentiator circuit 40 (C4, R4, C5, R5) and its effect on the tachometer section of chip L290. Briefly, as will be explained hereinafter, the differentiator circuit 40 defines the time constants which in turn determine the gain of the tachometer output signal produced by amplifier A3.

As is explained in the aforementioned SGS-ATES databook, the mechanical/electrical interface between the position control system of FIG. 1 and the controlled motor (not shown) consists of an encoder which generates two sinusoidal signals A and B, 90° out of phase (leading or lagging according to the mode and direction) and proportional in frequency to the speed of motor rotation. The encoder also provides an output 0 at an origin position of the motor shaft which is used to set the initial position.

The encoder signals are filtered by the networks R2, C2 and R3, C3 and are supplied as inputs FTA and FTB to amplifiers A1 and A2 of the tachometer section of chip L290. The main function of the tachometer section, as specified in the aforementioned databook, is to implement the following expression:

$$TACHO = \frac{dVAA}{dt} \cdot \frac{FTB}{|[FTB]|} - \frac{dVAB}{dt} \cdot \frac{FTA}{|[FTA]|}$$

Thus the mean value of the TACHO output signal produced by amplifier A3 is proportional to the rotational speed of the motor and its polarity indicates the direction of rotation.

The above expression (1) is implemented by the tachometer section by amplifying the input signals FTA and FTB in amplifiers A1 and A2 to obtain VAA and VAB. The signals VAA and VAB are applied to the differentiator circuit 40, external to the chip L290, to produce the terms dVAA/dt and dVAB/dt. These signals are respectively applied to the inputs of multipliers M1 and M2. The second inputs to multipliers M1 and M2 are respectively FTB/|FTB| and FTA/|FTA|, represented by the above expression (1), which are produced by comparators CSA and CSB.

Although the circuitry of FIG. 1 could be analyzed in far greater detail and is indeed treated in much greater detail in the aforementioned databook and other published documentation, it should suffice for purposes herein to recognize from the foregoing that the amplitude of the tachometer output signal TACHO developed by amplifier A3 is dependent upon the time constants defined by differentiator circuit 40 which determine the value of terms dVAA/dt and dVAB/dt. A key concept in accordance with the present invention is that the amplitude of the tachometer output signal can be modified by changing the differentiator circuit time constants. In other words, the effective gain of the tachometer section of chip L290 need not be fixed as is characteristic of the prior art system depicted in FIG. 1 but rather can be changed to produce a higher amplitude tachometer output signal at normal or lower carriage speeds.

Attention is now directed to FIG. 2 which illustrates an embodiment in accordance with the present invention. It will be noted that the embodiment of FIG. 2 is structurally very similar to the circuitry depicted in FIG. 1. The differences primarily involve modifications in the external differentiator circuit 41. More specifically, the embodiment of FIG. 2 includes first and second switches S1 and S2, schematically depicted as single pole double throw switches. When the switches are thrown to the positions depicted in solid line in FIG. 2, the differentiator circuit, comprised of R4, C4 and R5, C5, is electrically identical to that depicted in FIG. 1. However, when the switches S1 and S2 are thrown to their second positions depicted by dashed line in FIG. 2, resistors R4a and R5a are respectively placed in parallel with resistors R4 and R5. This action of course reduces the effective resistance of resistors R4 and R5 and thus modifies the time constant introduced by the differentiator circuit. As should be apparent from the aforedescribed mathematical expression (1), this change in time constant will change the effective gain of the tachometer section and thus the amplitude of the tachometer output signal TACHO.

The schematically depicted switches S1 and S2 should of course, in practice comprise electronic switches, such as field effect transistors (F.E.T. switches). In accordance with the invention, the switches S1 and S2 are controlled by a sixth bit supplied by the printer control microprocessor. That is, as was described in connection with FIG. 1, a typical prior art positioning system using circuits L290 and L291 responds to a five bit velocity command provided by a control microprocessor. These bits 1–5 are applied to the D/A converter to produce an output voltage at the summing point 32 connected to the input of the error amplifier 34. In accordance with the present invention, the microprocessor provides a bit 6 which is used to control the state of switches S1 and S2 and thus the gain of the tachometer section and the amplitude of the tachometer output signal TACHO.

By controlling the tachometer gain based upon motor speed, considerably improved servo system performance can be achieved to permit more accurate motor control over a wider speed range. In order to understand the desirability of accurately controlling motor speed over wide range, it should be recalled that different rates of carriage movement are desired at different points of time in the normal operation of a high speed letter quality printer. For example, when the carriage is moving along a line printing one character at a time, it moves at a normal relatively slow speed as compared to when it is moving for a tabbing or carriage return operation. In order to provide for accurate carriage speed control both during high speed carriage movement as well as normal or lower speed, a system in accordance with the invention as depicted in FIG. 2 is able to selectively operate in a low speed high gain mode, analogous to a low gear condition, and a high gear condition. This mode or gear change which is effected by operating switches S1 and S2 enables the amplitude of the tachometer output signal to be increased by a gain factor, e.g. 3−5× in preferred embodiments of the invention to thereby permit much tighter control of carriage speed at lower carriage speeds.

More particularly, at lower carriage speeds, both switches S1 and S2 are open, i.e. in the solid line position in FIG. 2, and the time constants of the differentiator circuit are the product of R5 and C5 for the A channel and R4 and C4 for the B channel. For a 35/40 character per second daisy wheel printer, both capacitors C4 and C5 may be 4500 pf and both resistors R4 and R5 may be 2.55K. This produces a time constant of approximately 11.785 microseconds for the high gain or low gear mode. When the switches S1 and S2 are switched to the dashed line position depicted in FIG. 2, for the lower gain higher gear mode, the time constant falls to approximately ¼ and the amplitude of the tachometer output signal falls proportionally. Of course, the output of the D/A converter must also be concurrently proportionally reduced.

The use of a variable gain mode in accordance with the invention, as depicted in FIG. 2, avoids having to make the aforementioned performance compromises which have been characteristic of prior velocity servo systems designed for particular relatively narrow speed ranges.

By utilizing a gain mode change in accordance with the invention, the requirement for selecting matched components or dialing in symmetry or offset, as by utilization of variable resistor R9 in FIG. 1, is avoided. This enables commercially available LSI circuits such as L290 and L291 to be used for speed control in high speed high quality printers. The utilization of the two selectable gain modes effectively enables the analog tachometer section to operate optimumly at low speeds without fear of clipping and operate effectively at high speeds without fear that at low speeds the tachometer output will be in the noise and offset region. From a practical point of view, if the tachometer and D/A converter are providing a 3−5× greater output of low speeds, then any speed error for any reason will be 3−5× greater, obviously giving better control over speed variations attributable to mechanical causes. Moreover, by enabling LSI integrated circuits to be used instead of requiring the use of discrete components, systems in accordance with the invention can be designed so that signal levels lie closer to the midrange operating points of the components thereby assuring better absolute speed control.

As noted, it is preferable that the switches S1 and S2 be implemented as F.E.T. switches and it is also preferable that they be operated with no DC value across them in a low impedance circuit to avoid leakage problems. Also, when the switches S1 and S2 are operated to define the low gain high gear mode, it is preferable that the temperature coefficient of their on resistance be positive so that the printer is made to go slower as operating temperatures increase.

Figure 3A:
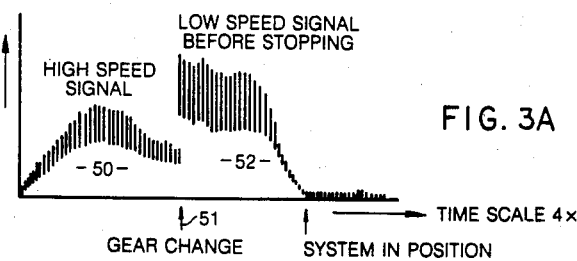
FIGS. 3a and 3b, are graphs showing the output of an analog tachometer in accordance with the present invention during operation at high and low speeds.
Figure 3B:
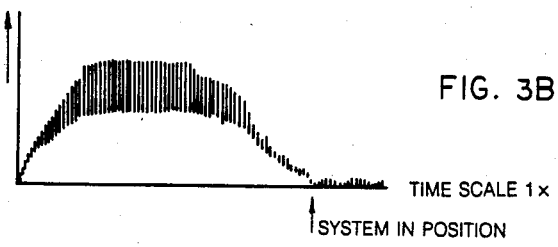

FIG. 3A depicts a typical cathode ray tube trace of the tachometer output signal supplied by amplifier A3 of FIG. 2. Note that when the carriage is moving at high speed, as is characteristic of printer tab or carriage return action, the system will operate in a low gain high gear mode 50. As the carriage approaches its target destination and the microprocessor reduces the speed of the carriage before stopping, the microprocessor will command the gear change 51, via bit 6 of the command word, to increase tachometer gain and amplitude of the tachometer output signal as depicted at 52 in FIG. 3A. For printing at normal or lower speeds, as depicted in FIG. 3B, the system will operated in its high gain low gear mode.

From the foregoing, it should now be appreciated that an improved analog servo system has been disclosed herein suitable for more accurately controlling the carriage speed of a high speed printer over a relatively wide speed range. The system is characterized by the use of an analog tachometer with circuit means which enables the tachometer to operate in either a high gain mode or a low gain mode, controlled by an external command bit supplied by a control microprocessor, as a function of carriage speed.

What is claimed is:

1. In an analog tachometer circuit for generating a tachometer signal in response to a sinusoidally varying encoder signal whose frequency is proportional to the speed being measured and which includes analog differentiating means responsive to said encoder signal and a predetermined time constant to generate a differential signal whose magnitude is representative of said speed, the improvement comprising:

first means for establishing a first time constant corresponding to a first speed range;

second means for establishing a second time constant corresponding to a second speed range; and switching means responsive to an external command for selectively providing said first or said second time constant to said analog differentiating means.

2. The servo of claim 1 further comprising a digital-to-analog converting means responsive to a plurality of digital velocity bits to produce a resultant analog reference output and analog comparing means for comparing said reference output with said tachometer signal to produce a servo error output, wherein said improvement further comprises means for coordinating a change in said differential signal in response to said external command being applied to said switching means with the change in said analog reference output in response to a change in said plurality of velocity bits whereby said servo error output signal will be essentially unaffected when said tachometer is switched from one of said speed ranges to a different one of said speed ranges.

* * * * *